(12) United States Patent
Sterns

(10) Patent No.: US 7,773,738 B2
(45) Date of Patent: Aug. 10, 2010

(54) SYSTEMS AND METHODS FOR PROVIDING RELAYED LANGUAGE INTERPRETATION

(75) Inventor: Thomas Sterns, Pacific Grove, CA (US)

(73) Assignee: Language Line Services, Inc., Monterey, CA (US)

( * ) Notice: Subject to any disclaimer, the term of this patent is extended or adjusted under 35 U.S.C. 154(b) by 118 days.

(21) Appl. No.: 11/534,597

(22) Filed: Sep. 22, 2006

(65) Prior Publication Data

US 2008/0086681 A1    Apr. 10, 2008

(51) Int. Cl.
*H04M 3/42* (2006.01)
*H04M 3/00* (2006.01)

(52) U.S. Cl. .............................. 379/201.01; 379/265.01

(58) Field of Classification Search ............ 379/201.01, 379/265.01
See application file for complete search history.

(56) References Cited

U.S. PATENT DOCUMENTS

| | | | |
|---|---|---|---|
| 4,445,211 A | 4/1984 | Webber | |
| 4,882,681 A | 11/1989 | Brotz | |
| 5,136,633 A | 8/1992 | Tejada et al. | |
| 5,353,335 A | 10/1994 | D'Urso et al. | |
| 5,375,164 A | 12/1994 | Jennings | |
| 5,392,343 A | 2/1995 | Davitt et al. | |
| 5,426,706 A | 6/1995 | Wood | |
| 5,509,060 A | 4/1996 | Hall et al. | |
| 5,544,229 A | 8/1996 | Creswell et al. | |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,825,863 A | 10/1998 | Walker | |
| 5,875,422 A | 2/1999 | Eslambolchi et al. | |
| 5,884,246 A | 3/1999 | Boucher et al. | |

(Continued)

FOREIGN PATENT DOCUMENTS

EP    0 601 710    6/1994

(Continued)

OTHER PUBLICATIONS

Carey Gillam, "Language Line Gives Guests A Chance To Reach Out Touch A Translator", The Kansas City Business Journal, Aug. 30, 1991, p. 2, vol. 9 No. 50.

(Continued)

*Primary Examiner*—Rasha S Al Aubaidi
(74) *Attorney, Agent, or Firm*—Patent Ingenuity, P.C.; Samuel K. Simpson

(57) ABSTRACT

Systems and methods disclosed herein to provide relayed language interpretation are disclosed herein. The relayed language interpretation permits a caller to communicate with a third party. A language interpretation call is received from a caller at a language interpretation provider. A caller language corresponding to a language spoken of the caller is determined. A first interpreter that speaks the caller language and a base language is engaged to the language interpretation call. An indication from the caller that the caller needs interpretation between the caller language and a third-party language is received. The first interpreter is permitted to engage a second interpreter that speaks the base language and the third-party language. The second interpreter is engaged to the language interpretation call. The third party is engaged to the language interpretation call. Over-the-phone interpretation of the caller language and the third-party language is performed.

26 Claims, 7 Drawing Sheets

U.S. PATENT DOCUMENTS

| | | | |
|---|---|---|---|
| 5,960,070 | A | 9/1999 | O'Donovan |
| 5,970,124 | A | 10/1999 | Csaszar et al. |
| 5,991,748 | A | 11/1999 | Taskett |
| 6,038,292 | A | 3/2000 | Thomas |
| 6,069,939 | A | 5/2000 | Fung et al. |
| 6,097,806 | A | 8/2000 | Baker et al. |
| 6,115,458 | A | 9/2000 | Taskett |
| 6,134,306 | A | 10/2000 | Lautenschlager et al. |
| 6,161,082 | A | 12/2000 | Goldberg et al. |
| 6,205,215 | B1 | 3/2001 | Dombakly |
| 6,208,851 | B1 | 3/2001 | Hanson |
| 6,227,972 | B1 | 5/2001 | Walker et al. |
| 6,229,879 | B1 | 5/2001 | Walker et al. |
| 6,246,755 | B1 | 6/2001 | Walker et al. |
| 6,263,058 | B1 | 7/2001 | Lautenschlager et al. |
| 6,289,088 | B1 | 9/2001 | Bruno et al. |
| 6,292,769 | B1 | 9/2001 | Flanagan et al. |
| 6,301,566 | B1 | 10/2001 | Costello |
| 6,337,903 | B1 | 1/2002 | Manner |
| 6,363,411 | B1 | 3/2002 | Dugan et al. |
| 6,381,316 | B2 | 4/2002 | Joyce et al. |
| 6,597,765 | B1 | 7/2003 | Ksiazek |
| 6,665,387 | B2 | 12/2003 | Hannu |
| 6,690,932 | B1 | 2/2004 | Barnier et al. |
| 6,760,411 | B2 | 7/2004 | Dybedokken et al. |
| 6,801,602 | B2 | 10/2004 | Glossbrenner |
| 6,826,269 | B2 | 11/2004 | Afana |
| 6,856,674 | B1 | 2/2005 | De Trana et al. |
| 6,907,256 | B2 | 6/2005 | Hokao |
| 6,920,487 | B2 | 7/2005 | Sofer et al. |
| 6,963,557 | B2 | 11/2005 | Knox |
| 6,999,758 | B2 | 2/2006 | Pence et al. |
| 7,006,604 | B2 | 2/2006 | Engelke |
| 7,068,668 | B2 | 6/2006 | Feuer |
| 2001/0032878 | A1 | 10/2001 | Tsiounis et al. |
| 2001/0034599 | A1 | 10/2001 | Kage et al. |
| 2002/0046035 | A1 | 4/2002 | Kitahara et al. |
| 2002/0069048 | A1 | 6/2002 | Sadhwani et al. |
| 2002/0069067 | A1 | 6/2002 | Klinefelter et al. |
| 2002/0097854 | A1 | 7/2002 | Bauer |
| 2002/0152063 | A1 | 10/2002 | Tokieda et al. |
| 2002/0169592 | A1 | 11/2002 | Aityan |
| 2002/0181669 | A1 | 12/2002 | Takatori et al. |
| 2003/0008639 | A1 | 1/2003 | Kanegae |
| 2003/0095542 | A1 | 5/2003 | Chang et al. |
| 2003/0144912 | A1 | 7/2003 | McGee |
| 2003/0149557 | A1 | 8/2003 | Cox et al. |
| 2003/0154122 | A1 | 8/2003 | Jackson, Jr. et al. |
| 2003/0158722 | A1 | 8/2003 | Lord |
| 2003/0163300 | A1 | 8/2003 | Kasvand et al. |
| 2004/0014462 | A1 | 1/2004 | Surette |
| 2004/0092293 | A1 | 5/2004 | Lee et al. |
| 2004/0128139 | A1 | 7/2004 | Ilan et al. |
| 2004/0165579 | A1 | 8/2004 | Mandle |
| 2004/0267538 | A1 | 12/2004 | Obuchi et al. |
| 2005/0122959 | A1 | 6/2005 | Ostrover et al. |
| 2005/0129215 | A1 | 6/2005 | Parker |
| 2005/0149335 | A1 | 7/2005 | Mesbah et al. |
| 2005/0152530 | A1 | 7/2005 | Pence et al. |
| 2005/0209859 | A1 | 9/2005 | Tenembaum et al. |
| 2005/0216252 | A1 | 9/2005 | Schoenbach et al. |
| 2005/0261890 | A1 | 11/2005 | Robinson |
| 2005/0272414 | A1 | 12/2005 | Vallarino |
| 2006/0026001 | A1 | 2/2006 | Bravin et al. |
| 2006/0126821 | A1* | 6/2006 | Sahashi .................. 379/387.01 |
| 2006/0165225 | A1 | 7/2006 | Sahashi |
| 2007/0064915 | A1* | 3/2007 | Moore et al. ........... 379/265.12 |

FOREIGN PATENT DOCUMENTS

| | | |
|---|---|---|
| EP | 1 041 801 A2 | 10/2000 |
| EP | 1 545 110 | 6/2005 |
| EP | 1 545 111 | 6/2005 |
| JP | 2001 313721 | 11/2001 |
| JP | 2002 073783 | 3/2002 |
| JP | 2002 142024 | 5/2002 |
| JP | 2002 152387 | 5/2002 |
| JP | 2002 163400 | 6/2002 |
| JP | 2002 237897 | 8/2002 |
| JP | 2002 244842 | 8/2002 |
| JP | 2003 069720 | 3/2003 |
| JP | 2003 110702 | 4/2003 |
| JP | 2003 234833 | 8/2003 |
| JP | 2004 023262 | 1/2004 |
| JP | 2004 260430 | 9/2004 |
| JP | 2005 286979 | 10/2005 |
| RU | 2 143 135 C1 | 12/1999 |
| WO | WO 2004/030330 | 4/2004 |

OTHER PUBLICATIONS (author not indicated), "The Phone Call That Speaks Your Language", Money magazine, Jun. 1991, p. 32, vol. 20, No. 6.

(author not indicated), "News and Reports—AT&T Language Line", Man ing Service Quality, 1995, vol. 5 No.1.

(author not indicated), "NHS Direct Translator—National Health Services", Chemist & Druggist Magazine, Sep. 25, 2004.

Blayne Cutler, "Multilingual Marketers Work For The Police", American Demographics, Jan. 1992, p. 10, vol. 14 No. 1.

(author not indicated), "Telephone Translators Covered In Deal Between SSH And California Company", Hospital Materials Management, Jun. 2002.

Frederick Gabriel, "Providers Say 'Ah', 'Ay' and 'Oy'—Health Care Providers Which Treat Non-English Patients Must Contend With Cultural And Linguistic Challenges", Crain's New York Business, Jan. 26, 1998, 14(4):30.

Brendan B. Read. "Gracias Por Llamar (Thank You For Calling)", Call Center Magazine, Oct. 2003, p. 32, vol. 16 No. 10.

Phil Zinkewicz, "In Any Other Language—Translators Handle Emergency Calls Or Business/Industry Needs", Insurance Advocate, Mar. 8, 2004, p. 2.

Language Lines Services, "Language Line Services Tutorial".

Language Line Services, "Commonly Asked Interpretation Questions And Answers", Jun. 22, 2004.

Language Line Services, "Over-The-Phone Language Interpretation . . . How Does That Work Exactly?", http://www.languageline.com/prod_serv_interp.php, 2 pages.

Tele-Interpreters, "Tele-Interpreters On-Call", http://web.archive.org/web/19990128224906/http://www.teleinterpreters.com/, 8 pages.

Tele-Interpreters, "Over-The-Phone Language Interpretation Services", http://www.teleinterpreters.com/otp_interpretation_services.aspx, 3 pages.

Network Omni, "On-Demand And Global OPI Services. 24/7/365 in 150 Languages", http://www.networkomni.com/opi-offering.asp, 2 pages.

Network Omni, "Translating On Demand In 140 Languages", http://web.archive.org/web/20000308070011/www.networkomni.com/TranslationLine.html, 2 pages.

* cited by examiner

SYSTEMS AND METHODS FOR PROVIDING RELAYED LANGUAGE INTERPRETATION

BACKGROUND

1. Field of the Disclosure

The present disclosure relates generally to offering language interpretation services. In particular, the present disclosure relates to providing a language interpretation via a relay mechanism.

2. General Background

Modern telecommunications systems continue to integrate the world. Multilingual communication has therefore become more prominent. Many businesses that depend on global commerce rely on live oral communication that must be conveyed to customers in different languages. In order to provide better service and improve commercial transactions with customers, many businesses utilize and subscribe to interpretation services to perform such necessary interpretation between the customer and the business. In addition, individual users may also utilize interpretation services to communicate with other individuals or business entities. However, interpreters that are able to interpret between two uncommon languages (e.g. Polish to Arabic) are scarce, and offering interpretation of two uncommon languages has proved to be a challenge.

SUMMARY

In one aspect, there is a method of providing a relayed language interpretation service to permit a caller to communicate with a third party. A language interpretation call is received from a caller at a language interpretation provider. A caller language corresponding to a language spoken of the caller is determined. A first interpreter that speaks the caller language and a base language is engaged. The base language can be for example English, French or Spanish. An indication that the caller needs interpretation between the caller language and a third-party language can be received from the caller. The first interpreter is permitted to engage a second interpreter that speaks the base language and the third-party language. The second interpreter is engaged to the language interpretation call. The third-party is then engaged to the language interpretation call. Over-the-phone interpretation of the caller language and the third-party language can then be conducted. The language interpretation call is received through a public switched network or a data network such as the Internet.

Furthermore, the language of the caller can be identified by an interactive voice response system. Alternatively, the language of the caller can be identified by matching the telephone number of the caller to a number in a database that stores telephone numbers and corresponding languages.

In another aspect, the second interpreter can be engaged to the language interpretation utilizing one or more DTMF tones. In another aspect, the indication from the caller can be received through an interactive voice response system.

In a further aspect, a message can be received from the caller. For example, the message is an oral message. The message can be interpreted from a caller language to the base language. Additionally, the message can be interpreted from the base language to the third-party language. In addition, the message can be provided in the third-party language to the third party.

In another aspect of the method, the third party can be engaged to the language interpretation call by requesting the caller to connect the third party to the language interpretation call. In another aspect, the third party can be engaged to the language interpretation call comprises dialing a telephone number of the third party.

In another aspect, there is a method of providing a relayed language interpretation service. A language interpretation call is received from a caller at a language interpretation provider. A caller indication of a need to communicate with a third party is received via live interpretation of a caller language and a third-party language. A first interpreter that can interpret between the caller language and a base language is identified. A second interpreter that can interpret between the base language and the third-party language is identified. The first interpreter to the language interpretation call is engaged. The second interpreter to the language interpretation call is engaged. The third party to the language interpretation call is engaged. Live interpretation between the caller language and the third-party language is conducted.

In another aspect, there is a system of providing a relayed language interpretation service to permit a caller to communicate with a third party. The system may comprise a call processing module, a first interpreter telephonic device, and a second interpreter telephonic device. The call processing module can receive a language interpretation call from a caller. The call processing module can be further configured to receive an indication from the caller that the caller needs interpretation between caller language spoken by the caller and a third-party language. The call processing module is configured to identify a first interpreter that speaks the caller language and a base language. The call processing module is further configured to identify a second interpreter that speaks the base language and the third-party language. In addition, the first interpreter telephonic device permits the first interpreter to engage in the language interpretation call. The first interpreter telephonic device is configured to receive an input from the first interpreter to permit the first interpreter to engage a second interpreter that speaks the base language and the third-party language. The second interpreter telephonic device can permit the second interpreter to engage in the language interpretation call.

DRAWINGS

DETAILED DESCRIPTION

The systems and methods disclosed herein provide over-the-phone relayed language interpretation. Conventional methods of interpretation generally involve one language pair (e.g., Spanish-English). Language pairs used in language interpretation most often include English or other European languages, because language pairs are limited by historic business demand and the number of available interpreters. The increased globalization of outsourced call centers creates a need for sustained supply of uncommon language pairs such as Korean-Polish or Japanese-Arabic for example. Because qualified interpreters for these pairs are rare, a relayed language interpretation system and method is proposed. Over-the-phone interpretation using the relay system and method as disclosed herein engages two easily available interpreters.

The first interpreter speaks a first language and a base language. The second interpreter can speak the base language and a third-party language. The first interpreter interprets the communication from a caller in the first language to the base language. The second interpreter communicates in the base language with the first interpreter. The second interpreter can then communicate with the third party in the second language. For example in the case of interpretation from Korean to Polish, instead of attempting to engage one interpreter that can interpret Korean to Polish, two interpreters that speak common language pairs can be engaged. Thus, an interpreter that speaks Korean and English, and an interpreter that speaks English and Polish can be easily engaged. When the Korean speaker speaks in Korean, the first interpreter interprets from Korean into English for the second interpreter. The second interpreter can then interpret from English to Polish for the Polish speaker, and vice versa. Various methods of engaging a caller, a third party, a first interpreter and a second interpreter in a relayed language interpretation call are discussed below.

In one embodiment, a base language can be a language that is common and widely spoken in the world. In another aspect, a base language is a language that the first interpreter and the second interpreter have in common.

Language interpretation between a first language and a second language generally means communicating language expression from the first language to the second language and/or from the second language to the first language.

Figure 1:
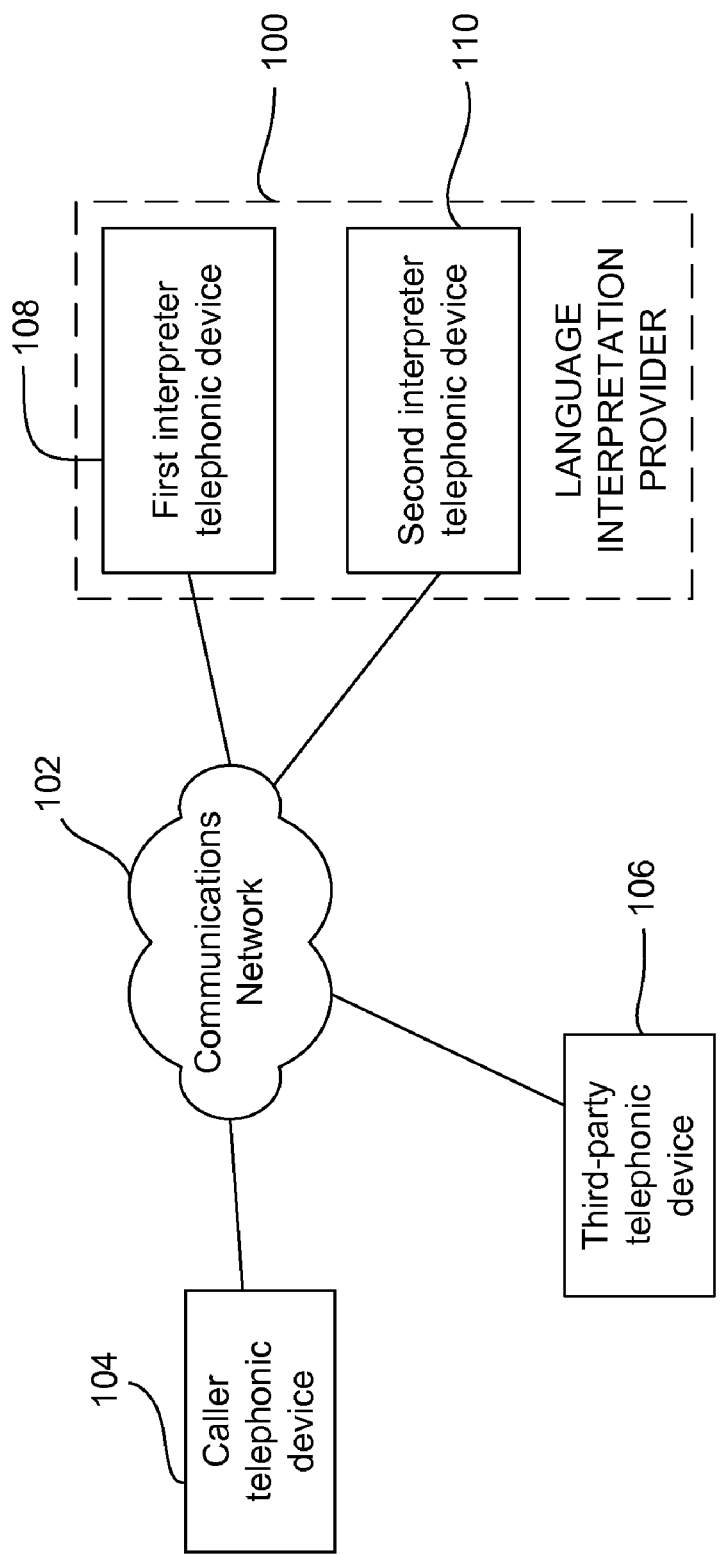
FIG. 1 illustrates a component diagram of a system for providing language interpretation services.

FIG. 1 illustrates a component diagram of a system for providing language interpretation services. The system can include a language interpretation provider 100 that provides interpretation services to individual and business entities. Individuals and businesses that call the language interpretation provider 100 require live language interpretation for communicating with a third party caller. Thus, for example, a caller can utilize a caller telephonic device 104 to communicate through the communications network 102 with the language interpretation provider 100. In addition, the caller communicates through the communications network 102 with a third party that speaks a different language than the caller. The third party can also communicate with the caller and/or the language interpretation provider 100 through with the communications network 102. The third party can utilize a third party telephonic device 106. As such, the language interpretation provider can permit the communication of the caller and the third party by providing language interpretation through one or more interpreters.

In one embodiment, the language interpretation provider can provide two interpreters to interpret the call between the caller and the third party. A first interpreter can communicate with the caller and the third party through a first interpreter telephonic device 108. In addition, a second interpreter can communicate with the caller and the third party via a second interpreter telephonic device 110. The caller telephonic device 104, the third party telephonic device 106, the first interpreter telephonic device 108 and the second interpreter telephonic device 110 can be embodied as any device that can communicate telephonically with another telephonic device. For example, any of these aforementioned devices can be a landline telephone, a cellular telephone, a computer device equipped with a modem, a Smartphone, a PDA, etc. In addition, each of these communication devices can be equipped to communicate through the communications network 102 via a modem or a transceiver that can permit the device to receive either analog or digital signals indicative of a telephonic communication such as a voice signal. Furthermore, the communications network 102 can be for example a public switched telephone network, a computer network, a cellular communications network, or a data network such as the Internet or an intranet.

In one embodiment, the caller calls the language interpretation provider 100 at a language interpretation number. The language interpretation number can be a toll free number or a toll number. In one example, upon receiving the call from the caller, the language interpretation provider 100 can then provide interpretation services to the caller, while a third party that had initially called the caller and is on hold. In another example, the language interpretation provider 100 can be configured to assist the caller in determining the third party to be called and/or to engage with the third party if the party was not originally already connected to the call.

The language interpretation provider can supply with a first and a second interpreter for instances in which the language of the caller and of the third party are languages that are less common, such that interpretation using a single interpreter from the caller language to the third-party language and vice versa is more difficult. Thus, in one example, direct interpretation from Korean to Polish might be more difficult than direct interpretation from Korean to English in combination with direct interpretation from English to Polish. Therefore, for example, the language interpretation provider 100 can provide the first interpreter to interpret from Korean to English and the second interpret to interpret from English to Polish. As such, in order to conduct the call and interpret the conversation between the caller and the third party, the first interpreter, the second interpreter, the caller and the third party can be engaged in a four-way call.

Figure 2:
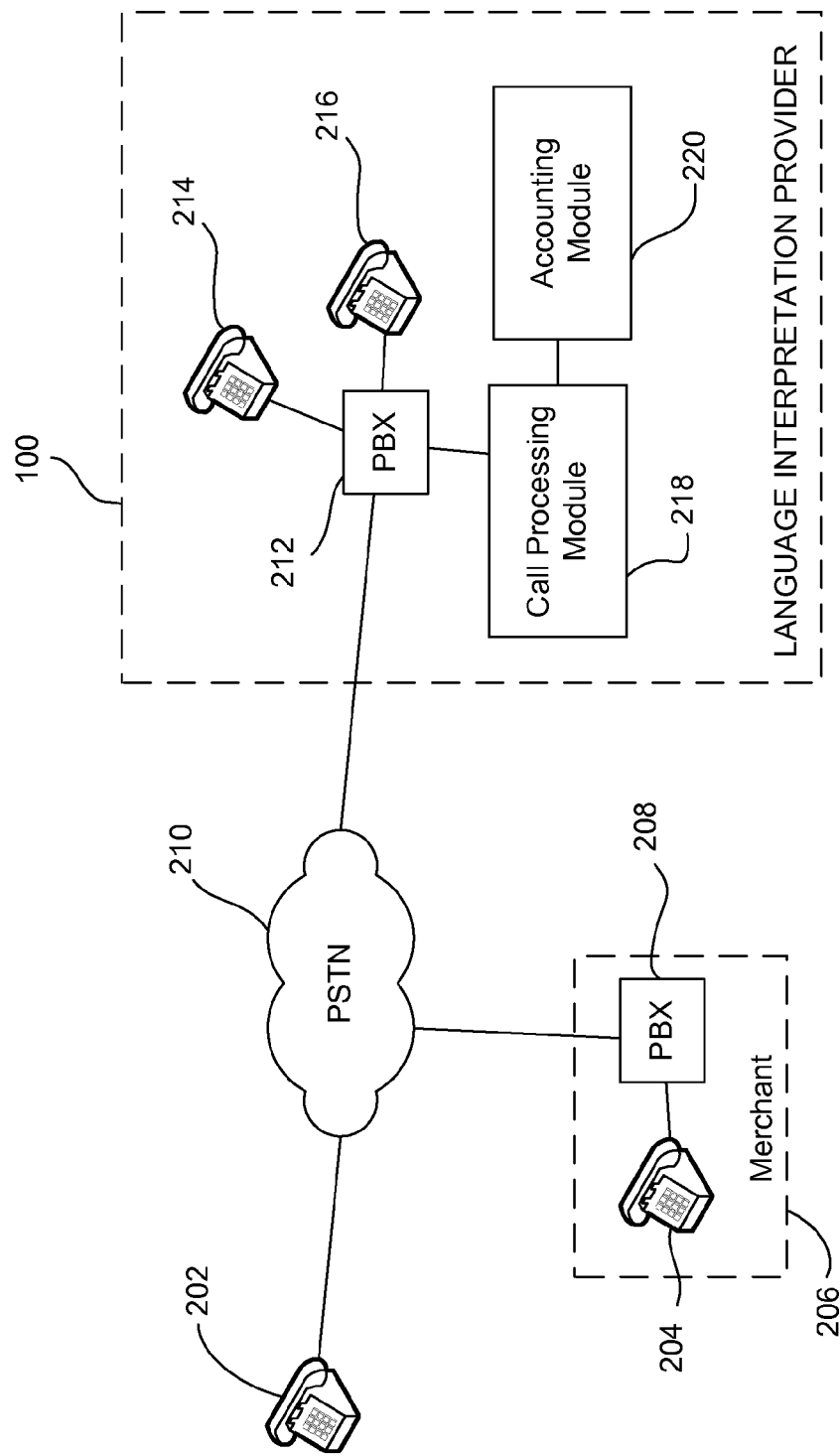
FIG. 2 illustrates a component diagram of a system for providing language interpretation services utilizing a public switched network.

FIG. 2 illustrates a component diagram of a system for providing language interpretation services utilizing a public switch network. In one embodiment, the caller can utilize telephonic device to communicate over the public switch network 210 with the language provider 100. Thus, the third party can be a merchant that communicates through the telephonic device 204 via a private branch exchange 208 with the public switch network 210. In one example, the caller can call directly the language interpretation provider 100 and then engage the merchant 206 for a relayed language interpretation call as disclosed herein. In another example, the caller can call the merchant 206 and subsequently call the language interpretation provider 100 in order to receive language interpretation services.

In another embodiment, the caller can be the merchant 206. For example, if the merchant 206 receives a call from a third party calling from telephonic device 202, the merchant 206 can place the third party using the telephonic device 202 on hold and call the language interpretation provider 100 to engage an interpreter or multiple interpreters on the line. In yet another example, the caller can be the merchant 206 who calls directly the language interpretation provider 100 with a prospect of contacting a third party such as a customer at telephonic device 202.

The language interpretation provider 100 can include a private branch exchange 212 that communicates directly with one or more interpreters such as interpreter 214 and interpreter 216. The private branch exchange 212 can communicate with interpreters 214 and 216 through direct lines and not through a public switch network. In another embodiment, the private branch exchange 212 can communicate with interpreters 214 and 216 through the public switch network 210. In yet another embodiment, the public switch network can communicate with interpreters through a call processing module 218 that is configured to communicate with a data network that can receive and transmit voice signals through such network and communicate with an interpreter, for example connected to the Internet.

The call processing module 218 can be configured to relayed language interpretation calls as disclosed herein. In one embodiment, the call processing module 218 is configured to receive an indication of the language spoken by the caller. In one example, the indication can be automatically determined by identifying the telephone number of the caller and performing a look-up or search in order to identify the associated language of the caller. The look-up search can be conducted on a local or remote database (not shown) that stores telephone number data and associated languages. In another example, the indication of the language as spoken by the caller can be determined through an interactive voice response system that provides one or more option menus in voice recognition capabilities so as to permit the caller to indicate the language of the caller. As such, based on the language of the caller, the call processing module 218 can be configured to engage an interpreter that can interpret between the caller's language and a base language. Furthermore, the call processing module 218 can further be configured with logic that can receive input from an interpreter such as interpreter 214 in order to indicate that a second interpreter is required to be engaged or connected to a call with the caller. For example, the call processing module 218 can be configured to permit the interpreter 214 to select the languages in which the second interpreter 216 to be engaged to the call should be proficient.

In another embodiment, the call processing module 218 can be configured with logic to receive an input from a caller indicating the caller's language as well as the third party's language. In another embodiment, the call processing module 218 can be configured to receive from the caller input indicative of a third party's language and further automatically determine the type of language associated with the caller based on the telephone number of the caller.

Once the call processing module 218 has received input on the language associated with the caller and the language spoken by the third party, the call processing module 218 can identify either one interpreter that can interpret from the caller's language to the third party's language and vice versa, or two interpreters that can perform a relayed language interpretation call. In one example, the call processing module 218 can utilize a pre-selected base language such as English and identify two interpreters that speak the base language as well as the caller's language and the third party's language, respectively. For example, if the caller speaks Mandarin Chinese, and the third party speaks Lebanese, then the call processing module 218 can be configured to select two interpreters. One interpreter selected by the call processing module 218 can be proficient in Mandarin Chinese and English, and the second interpreter can be proficient in Lebanese and English.

In another embodiment, the call processing module 218 can be configured to look up language pairs that can be matched in order to complete a relayed interpretation call. Thus, for example, each interpreter associated with the language interpretation provider 100 can have one or more language pairs associated with interpreter. For example, interpreter 214 may be trilingual and may be able to speak English, French and Lebanese. In addition, the interpreter 214 may be able to interpret among those three languages. Therefore, interpreter 214 would have three language pairs associated with them. That is, interpreter 214 would be able to interpret the following language pairs: English-French, English-Lebanese, and Lebanese-French. If, for example, the interpreter 216 is bilingual and only speaks French and Mandarin Chinese, the call processing module 218 may be able to utilize interpreter 214 and interpreter 216 in order to complete a relayed language interpretation call. A relayed language interpretation call would require interpreter 214 to interpret Lebanese to French. In addition, the call processing module 218 would require the interpreter 216 to interpret French to Mandarin Chinese. Thus, interpreter 214 and interpreter 216 can participate in a relayed language interpretation call that interprets from Mandarin Chinese to Lebanese and vice versa. As such, the call processing module 218 can be configured with logic to look up on the respective language pairs associated to each interpreter and match with another interpreter based on a common base language.

In a further embodiment, the call processing module 218 can be associated with an accounting module 220 that can keep track of the minutes of interpretation; the number of interpreters utilized and associated charges on a relayed language interpretation call. Thus, the accounting module 220 can further be configured with logic to look up per minute charges for long distance calls, user accounts, billing, etc.

Figure 3:
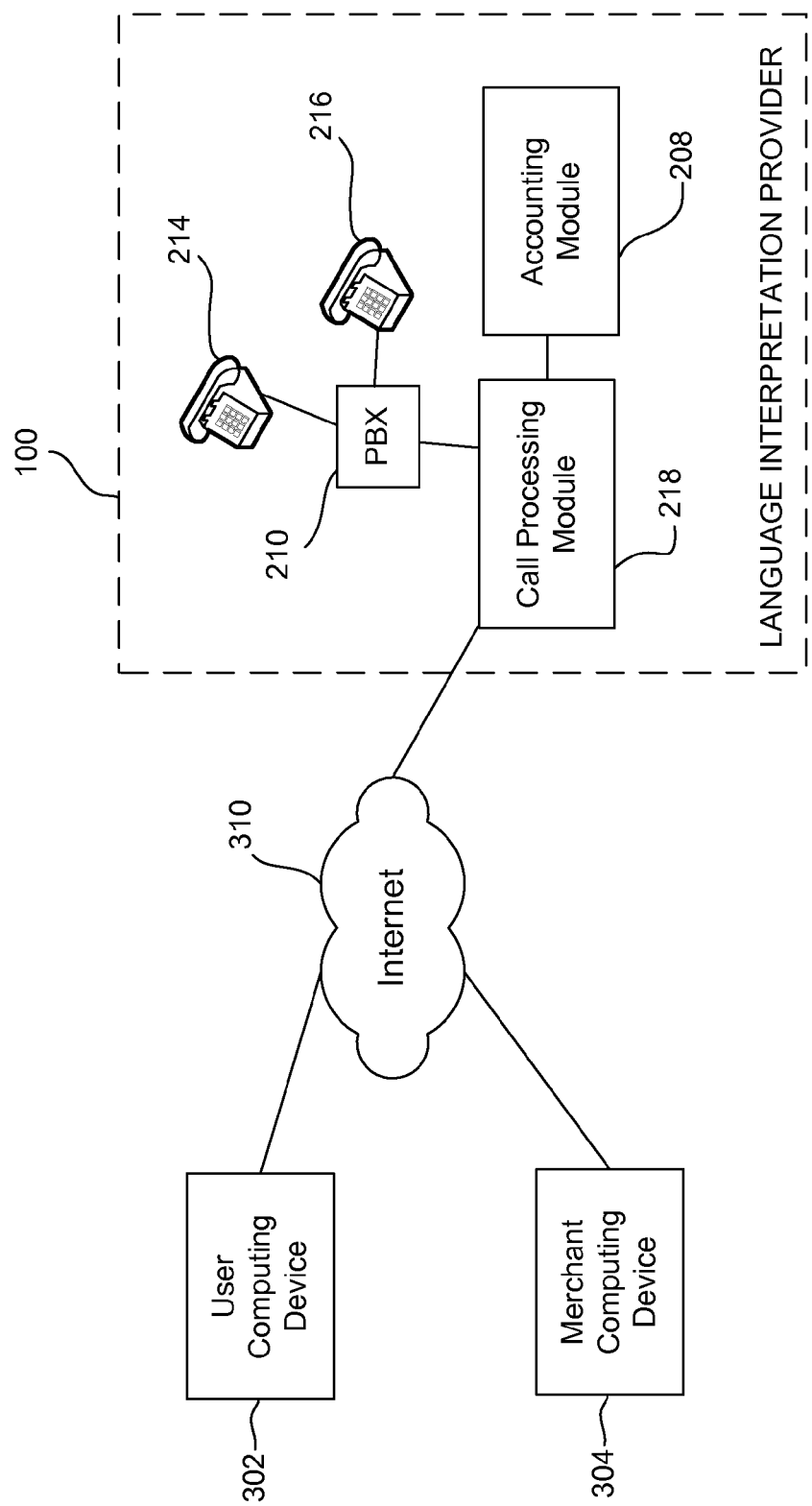
FIG. 3 illustrates a component diagram of a system for providing language interpretation services utilizing the Internet.

FIG. 3 illustrates a language interpretation system to provide language interpretation over the Internet in one example. As previously mentioned, language interpretation provider 100 can include a call processing module 218 that can further be configured with a transceiver that receives and transmits data signals over the Internet.

The data signals transmitted by the call processing module 218 can include telephonic signals and/or data packets that are communicated to the caller computing device 302 and to the third party computing device 304. As such, the caller computing device 302 can be for example a laptop, desktop computer or a handheld wireless device that has internet connectivity. Likewise, the third party computing device 304 can also be a laptop, desktop or any other computing device that has Internet connectivity. Data calls received by the call processing module 218 from the caller computing device 302 or the third party computing device 304 can then be relayed to the private branch exchange 212 in order to communicate the voice signal and/or data to the interpreters 214 or 216.

As depicted herein, FIG. 2 and FIG. 3 are simply exemplary embodiments of a relay system. As such, multiple variations are contemplated. For example, interpreters can be communicated to the call processing module 218 through an interpreter computing device that is connected to the Internet. In other embodiments, a caller can be connected to the language interpretation provider 100 on a telephone call wherein the caller utilizes the caller computing device 302 to communicate over the Internet 310. In addition, the third party can be connected through a telephonic device that is communicated through a public switch network to the private branch exchange 212. As such, multiple variations wherein the caller, the third party and the interpreters of the language interpretation provider 100 can be communicated through one or more different data communication networks.

Figure 4:
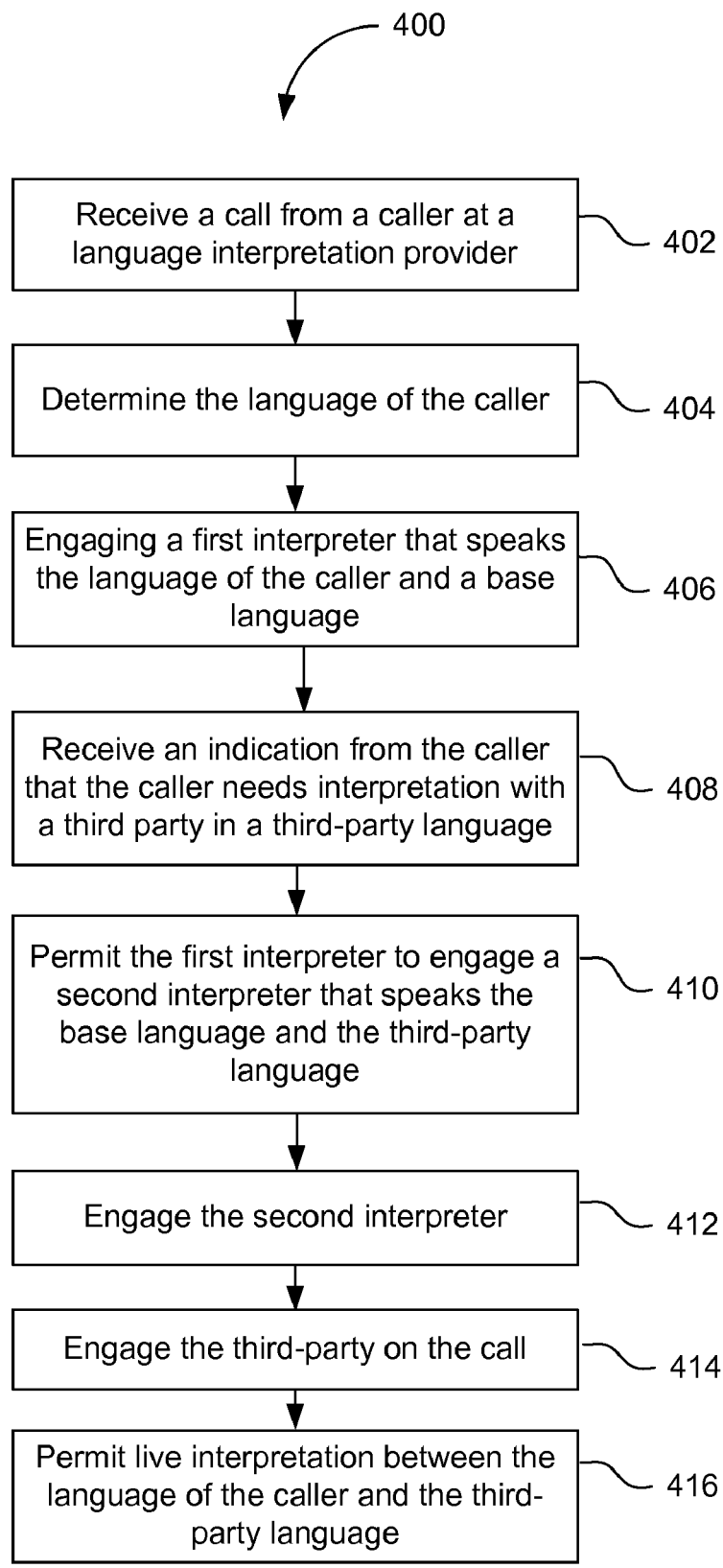
FIG. 4 illustrates a flow diagram for a process to service a relayed language interpretation call.

FIG. 4 illustrates a flow diagram for a process to service a relayed language interpretation call. At process block 402, a call from a caller is received at the language interpretation service. As previously mentioned, in one embodiment, the call can be originated from a caller who initially received a call from a third party wanting to establish communication with the caller. In another embodiment, the caller initiates a first call to the language interpretation provider 100 with the expectation of later calling the third party one or more interpreters have been engaged. Process 400 continues at process block 404.

At process block 404, the language spoken by the caller is determined. In one embodiment, the language spoken by the caller is determined through an interactive voice response system. The interactive voice response system can be configured to automatically respond to the incoming phone calls from a caller and provide options, menus to allow a caller to indicate the language spoken by the caller. In a further example, the interactive voice response system can be further configured to recognize multiple languages and dialects so as to better assist the caller. In addition, the interactive voice response system can be equipped with logic to categorize the type of language spoken by the caller (e.g., Asian, Arabic, Latin, Germanic or any other language category). In another embodiment, the language of the caller can be identified based on the telephone number of the caller. As mentioned earlier, the call processing module 218 can be configured to collect data pertaining to the incoming and outgoing calls. For example, caller telephone number (ANI), time and date when the phone call started, time and date when the phone call ended, the total number of minutes of a phone call, associated parties connected to the phone call, associated interpreters connected to the phone call, etc. Process 400 continues at process block 406.

At process block 406, a first interpreter that speaks the language of the caller and a base language can be engaged. The call processing module can be configured to search and identify an interpreter that can interpret between the language of the caller and a base language. The base language can be, for example, a language that is largely spoken in the world, such that the chances of identifying a first interpreter that speaks the caller language and the base language are higher. For example, it would be much easier to identify an interpreter that speaks English as a base language than Aramaic. In one example, the base language is automatically assigned. Thus, the language interpretation provider 100 can automatically always assign a base language that is English. In another example, the language interpretation provider 100 can assign a base language that is always Spanish. Furthermore, in another embodiment, the customer can select the base language. In another embodiment, the call processing module can select the base language from a group of base languages. Process 400 continues to process block 408.

At process block 408, an indication from the caller that the caller needs interpretation with a third party in a third-party language is received. Thus, in one example, the caller can indicate to the first interpreter engaged in the call that the caller would like to speak with a third party that has been previously engaged and connected to the caller before the caller had made the call to the language interpretation provider 100. The caller may be able to provide the language of the third party based on previous communication with the third party or via the incoming telephone number of the third party. For example, if the caller is a business or merchant, the caller may have implemented a telephone number that can be reached by customers who speak a specific language. For example, the merchant may have implemented a toll-free number for Korean speaking customers. Therefore, any calls received from third-party customers via the dedicated Korean telephone number will be assumed to require interpretation to Korean. As such, the caller is able to indicate to the first interpreter the third-party language required for interpretation as well as the language of the caller.

In another embodiment, the caller may request the first interpreter to engage a third party with whom the caller wishes to communicate. In one example, the caller can be a customer of a bank that first calls the language interpretation provider 100 and requests the first interpreter to identify a third party banking institution as well as the language spoken by the third party banking institution. The first interpreter can be provided with a database of telephone numbers and corresponding language information that indicates the language spoken at each of the telephone numbers in the database. The first interpreter can identify the business or entity with whom the caller wants to speak and further determine the language spoken by the third party. Process 400 continues at process block 410.

At process block 410, the first interpreter engages a second interpreter that speaks the base language and the third-party language. In one embodiment, the first interpreter can be provided with a command to enter on the switchboard or telephonic device of interpreter indicative of the need to engage another interpreter. In one example, the indication may be entered via a DTMF code.

In another embodiment, the first interpreter can request a second interpreter that speaks the third-party language and the base language spoken by the first interpreter. In another embodiment, the first interpreter can request a second interpreter that speaks the third-party language. Because the call processing module 218 can be configured to store information about the base language spoken by the first interpreter, the call processing module 218 only needs to receive data indicative of third-party language provided by the first interpreter to identify an interpreter that speaks the third-party language and the base language. Process 400 continues at process block 412.

At process block 412, the second interpreter is engaged. Process 400 continues at process block 414. At process block 414, the third party can be engaged on the call. In one example, the third party can be engaged on the call by the first interpreter who dials out a telephone number corresponding to the third party in order to join the third party on the call. In another example, the caller may have put the third party on hold while procuring language interpretation assistance from the language interpretation provider. In this case, the caller can simply join in the third party that has been waiting on hold while the caller was engaging one or more interpreters. Process 400 continues at process block 416.

At process block 416, live interpretation is performed between the caller and the third party so as to permit communication from the caller language to the third-party language, and vice versa.

Figure 5:
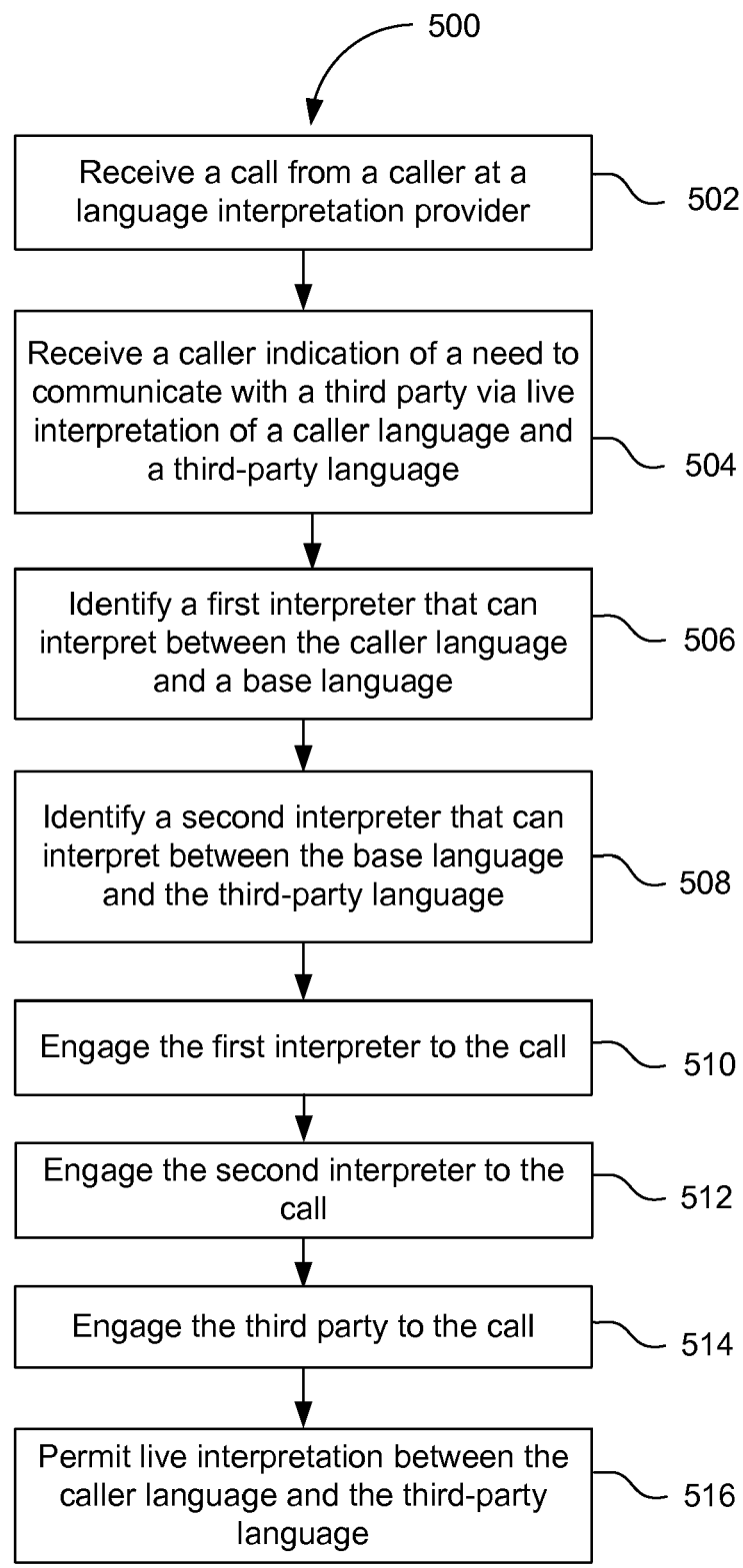
FIG. 5 illustrates a flow diagram for another process to service a relayed language interpretation call.

FIG. 5 illustrates a flow diagram for another process to service a relayed language interpretation call. At process block 502, a call is received from a caller at the language interpretation provider 100. The process 500 continues at process block 504. At process block 504, an indication from the caller that the caller needs to communicate with a third party is received. The indication from the caller can include the languages required to be interpreted. For example, the caller can indicate that the caller requires interpretation of Japanese and Catalan. As mentioned earlier, the caller can provide an indication of the language spoken by the caller. This indication can be provided either orally, through a voice recognition system, or utilizing DTMF tones through an interactive voice response system, etc. For example, the caller can also communicate with a live operator that can enter the two languages of interpretation required by the caller. Process 500 continues at process block 506.

At process block 506, a first interpreter that can interpret between the caller language and a base language is identified. The first interpreter can be identified based on the caller language and a base language according to the language pairs associated with a first interpreter. Process 500 continues at process block 508.

At process block 508, a second interpreter is identified such that the second interpreter can interpret between a base language and the third-party language. The first interpreter and the second interpreter can be engaged depending on the language pairs associated with the first interpreter and the second interpreter. As previously mentioned, the call processing module 218 can be configured to search through a database of interpreters, which includes the language pairs of each interpreter. The call processing module 218 can utilize as input a caller language and the third-party language in order to identify two interpreters that can perform the relayed language interpretation call. The two interpreters identified would have to have a language pair that matches a language relay scheme. That is, the first interpreter identified must have an associated language pair that includes the caller's language and the base language. Furthermore, the second interpreter identified must have an associated language pair of a base language and the third-party language, wherein the base language in the language pair of the first interpreter and the base language in the language pair of the second interpreter are the same. Process 500 continues at process block 510.

At process block 510, the first interpreter is engaged to the call. Process 500 continues to process block 512. At process block 512, the second interpreter is engaged to the call. Process 500 continues to process block 514.

At process block 514, the third party is engaged to the call. Process 500 continues to process block 516. At process block 516, live relayed language interpretation is performed between the caller language and the third-party language.

Figure 6:
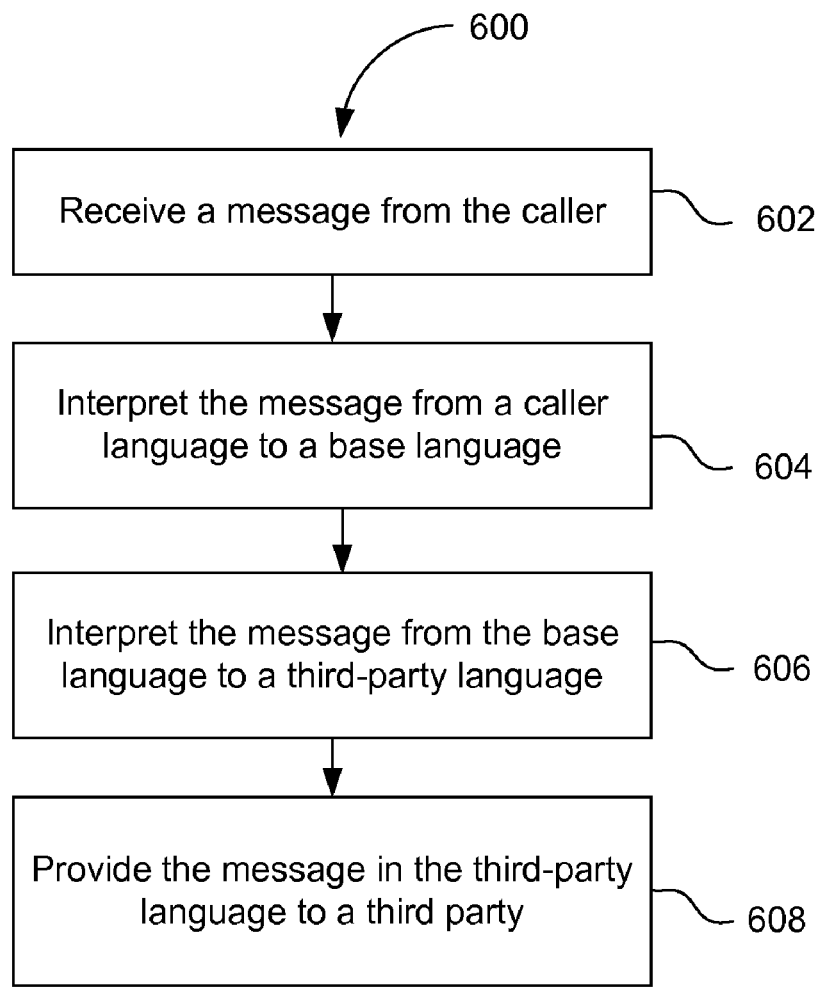
FIG. 6 illustrates a flow diagram for a process of interpreting a message using a relay method.

FIG. 6 illustrates a flow diagram for the process of interpreting a message using a relay method received from the caller. The message received from the caller can for example be in oral form or in text form. In one example, the message can be the word "Hello." Process 600 continues at process block 506.

At process block 604, the message is interpreted from the caller language to a base language. Thus, a first interpreter can be utilized to interpret the message from a caller language to the base language. For example, if a caller language is Mandarin Chinese and the base language is English, the first interpreter can interpret the message from Mandarin Chinese to English. Therefore, if the message is "hello," the first interpreter can interpret the message "hello" from Mandarin Chinese to English. Process 600 continues at process block 606.

At process block 606, the message is interpreted from the base language to a third-party language. A second interpreter can be utilized to interpret from the base language to a third-party language, therefore the second interpreter can for example be an interpreter that speaks English as well as Lebanese. Therefore, if the message is "hello," the second interpreter can interpret the message "hello" from English, which is the base language, to Lebanese, which is the third-party language. Process 600 continues at process block 608.

At process block 608, the message is provided to the third party in the third-party language. As such, the second interpreter can relay the interpreted message in the third-party language to the third party. Therefore, if the message is "hello" and the third-party language is Lebanese, the message "hello" can be provided to the third party in Lebanese. Furthermore, the process 600 can be utilized to transmit a message from the third party to the caller.

As such, the message from the third party can be interpreted by the interpreter from the third-party language to the base language and by the first interpreter from the base language to the caller language. Once the caller receives the message from the third party, the caller can then in turn transmit yet another message to the third party in response to the third party's message. This process can continue for the duration of the conversation between the caller and the third party.

Figure 7:
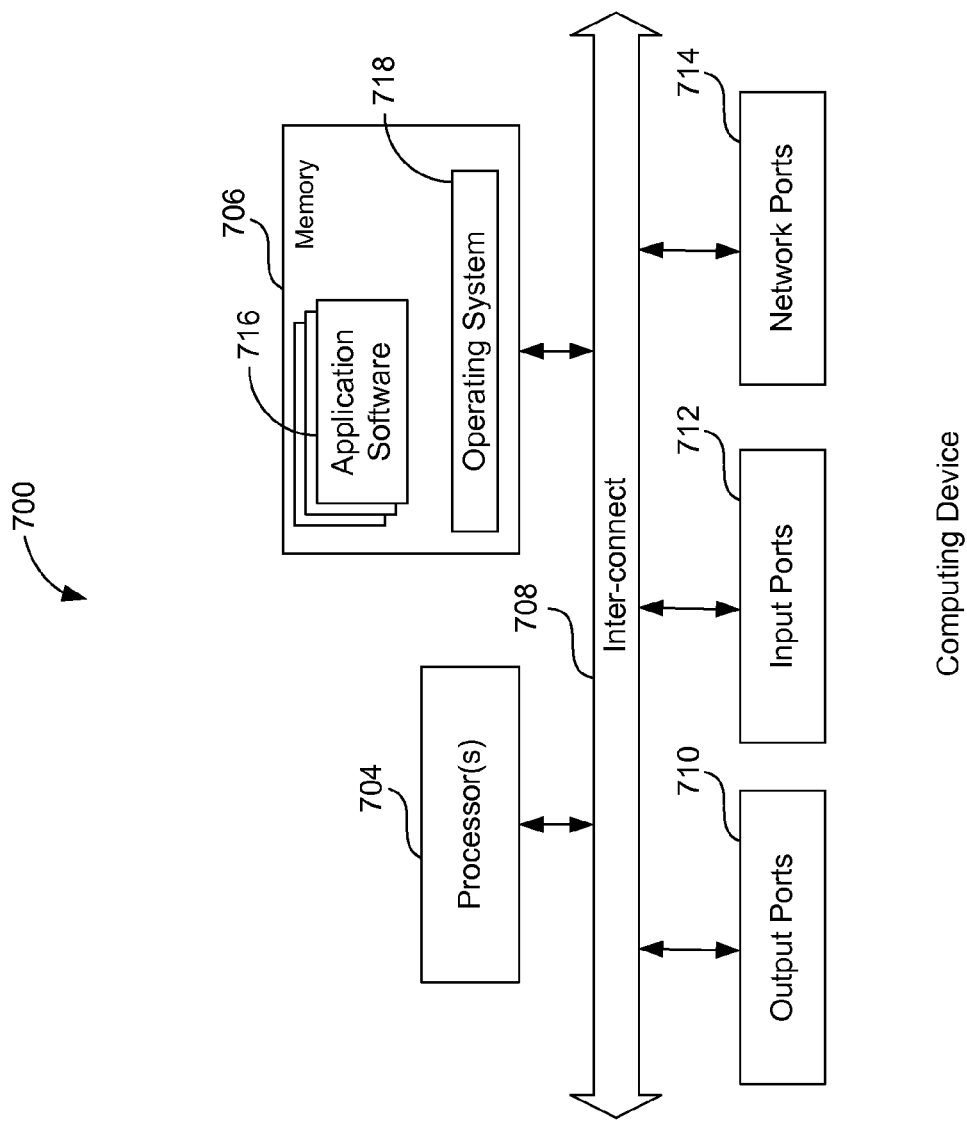
FIG. 7 depicts a component diagram of one example of a caller computing device.

FIG. 7 depicts a component diagram of one example of a computing device. The computing device 700 can be utilized to implement one or more computing devices, computer processes, or software modules described herein. In one example, the computing device 700 can be utilized to process calculations, execute instructions, receive and transmit digital signals, as required by the computing device 700. In one example, the computing device 700 can be utilized to process calculations, execute instructions, receive and transmit digital signals, as required by call processing module in the call processing module, communication logic in any of the telephonic devices discussed herein, the accounting module, and any other device that requires data processing or computing as disclosed herein to carry out logic or instructions.

Computing device 700 can be any general or special purpose computer now known or to become known capable of performing the steps and/or performing the functions described herein, either in software, hardware, firmware, or a combination thereof.

The computing device 700 includes an inter-connect 708 (e.g., bus and system core logic), which interconnects a microprocessor(s) 704 and memory 706. The inter-connect 708 interconnects the microprocessor(s) 704 and the memory 706 together. Furthermore, the interconnect 708 interconnects the microprocessor 704 and the memory 706 to peripheral devices such input ports 712 and output ports 710. Input ports 712 and output ports 710 can communicate with I/O devices such as mice, keyboards, modems, network interfaces, printers, scanners, video cameras and other devices. In addition, the output port 710 can further communicate with the display 104.

Furthermore, the interconnect 708 may include one or more buses connected to one another through various bridges, controllers and/or adapters. In one embodiment, input ports 712 and output ports 710 can include a USB (Universal Serial Bus) adapter for controlling USB peripherals, and/or an IEEE-1394 bus adapter for controlling IEEE-1394 peripherals, telephonic peripherals, etc. The inter-connect 708 can also include a communication network connection 714.

The memory 706 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 706 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 706 or obtained through input ports 712 and output ports 710.

In general, routines executed to implement one or more embodiments may be implemented as part of an operating system 718 or a specific application, component, program, object, module or sequence of instructions referred to as application software 716. The application software 716 typically can comprises one or more instruction sets that can be executed by the microprocessor 704 to perform operations necessary to execute elements involving the various aspects of the methods and systems as described herein. For example, the application software 716 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Although certain illustrative embodiments and methods have been disclosed herein, it can be apparent form the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and priciples of applicable law.

What is claimed is:

1. A method of providing a relayed language interpretation service, comprising:
    receiving a language interpretation call from a caller at a language interpretation provider;
    determining a caller language corresponding to a language spoken of the caller;
    engaging a first interpreter that speaks the caller language and a base language;
    receiving an indication from the caller that the caller needs interpretation between the caller language and a third-party language;
    engaging a second interpreter to the language interpretation call that speaks the base language and the third-party language;
    engaging the third-party to the language interpretation call; and
    providing over-the-phone interpretation of the caller language into the base language by the first interpreter and over-the-phone interpretation of the base language into the third-party language by the second interpreter such that a conversation is established between the caller and the third-party, the second interpreter hearing the over-the-phone interpretation by the first interpreter so that the second interpreter utilizes the base language for the over-the-phone interpretation of the base language into the third-party language.

2. The method of claim 1, wherein the language interpretation call is received through a public switched network.

3. The method of claim 1, wherein the language interpretation call is received through the Internet.

4. The method of claim 1, wherein identifying the language of the caller is performed by an interactive voice response system.

5. The method of claim 1, wherein identifying the language of the caller comprises matching the telephone number of the caller to a number in a database that stores telephone numbers and corresponding languages.

6. The method of claim 1, wherein the base language is English, French or Spanish.

7. The method of claim 1, wherein engaging the second interpreter to the language interpretation call comprises utilizing one or more DTMF tones.

8. The method of claim 1, wherein receiving the indication from the caller comprises receiving the indication from the caller through an interactive voice response system.

9. The method of claim 1, wherein permitting over-the-phone interpretation between the language of the caller and the third-party language further comprises:
    receiving a message from the caller;
    interpreting the message from a caller language to the base language;
    interpreting the message from the base language to the third-party language; and
    providing the message in the third-party language to the third party.

10. The method of claim 9, wherein the message is an oral message.

11. The method of claim 1, wherein engaging the third party to the language interpretation call comprises requesting the caller to connect the third party to the language interpretation call.

12. The method of claim 1, wherein engaging the third party to the language interpretation call comprises dialing a telephone number of the third party.

13. A method of providing a relayed language interpretation service, comprising:
    receiving a language interpretation call from a caller at a language interpretation provider;
    receiving a caller indication of a need to communicate with a third party via live interpretation of a caller language and a third-party language;
    identifying a first interpreter that can interpret between the caller language and a base language;
    identifying a second interpreter that can interpret between the base language and the third-party language;
    engaging the first interpreter to the language interpretation call;
    engaging the second interpreter to the language interpretation call;
    engaging the third party to the language interpretation call; and
    providing live interpretation of the caller language into the base language by the first interpreter and live interpretation of the base language into the third-party language by the second interpreter such that a conversation is established between the caller and the third-party, the second interpreter hearing the live interpretation by the first interpreter so that the second interpreter utilizes the base language for the live interpretation of the base language into the third-party language.

14. The method of claim 13, wherein the language interpretation call is received through a public switched network.

15. The method of claim 13, wherein the language interpretation call is received through the Internet.

16. The method of claim 13, wherein receiving the caller indication of the language of the caller is performed by an interactive voice response system.

17. The method of claim 13, wherein receiving the caller indication of the language of the caller comprises matching the telephone number of the caller to a number in a database that stores telephone numbers and corresponding languages.

18. The method of claim 13, wherein the base language is English, French or Spanish.

19. The method of claim 13, wherein permitting over-the-phone interpretation between the language of the caller and the third-party language further comprises:
receiving a message from the caller;
interpreting the message from a caller language to the base language;
interpreting the message from the base language to the third-party language; and
providing the message in the third-party language to the third party.

20. The method of claim 19, wherein the message is an oral message.

21. The method of claim 13, wherein engaging the third party to the language interpretation call comprises requesting the caller to connect the third party to the language interpretation call.

22. The method of claim 13, wherein engaging the third party to the language interpretation call comprises dialing a telephone number of the third party.

23. A system of providing a relayed language interpretation service, comprising:
a call processing module that receives a language interpretation call from a caller, the call processing module further configured to receive an indication from the caller that the caller needs interpretation between caller language spoken by the caller and a third-party language, wherein the call processing module is configured to identify a first interpreter that speaks the caller language and a base language, and is further configured to identify a second interpreter that speaks the base language and the third-party language;
a first interpreter telephonic device that engages the first interpreter in the language interpretation call, the first interpreter telephonic device being configured to receive an input from the first interpreter to engage a second interpreter that speaks the base language and the third-party language such that a conversation is established between the caller and a third-party, and a second interpreter telephonic device that engages the second interpreter in the language interpretation call so that the second interpreter hears the live interpretation by the first interpreter so that the second interpreter utilizes the base language for the live interpretation of the base language into the third-party language.

24. The system of claim 23, wherein the language interpretation call is received through a public switched network.

25. The system of claim 23, wherein the language interpretation call is received through the Internet.

26. The system of claim 23, wherein the base language is English, French or Spanish.

* * * * *